United States Patent
Schwab et al.

(10) Patent No.: US 11,370,616 B2
(45) Date of Patent: Jun. 28, 2022

(54) ROBOT TO PICK UP AND TRANSPORT OBJECTS, CORRESPONDING USE AND METHOD

(71) Applicant: MAGAZINO GMBH, Munich (DE)

(72) Inventors: Daniel Schwab, Munich (DE); Andreas Schnurrer, Munich (DE); Lukas Zanger, Munich (DE)

(73) Assignee: MAGAZINO GMBH, Munich (DE)

( * ) Notice: Subject to any disclaimer, the term of this patent is extended or adjusted under 35 U.S.C. 154(b) by 243 days.

(21) Appl. No.: 16/625,583

(22) PCT Filed: Jun. 14, 2018

(86) PCT No.: PCT/EP2018/065844
§ 371 (c)(1),
(2) Date: Dec. 20, 2019

(87) PCT Pub. No.: WO2018/234155
PCT Pub. Date: Dec. 27, 2018

(65) Prior Publication Data
US 2021/0387806 A1 Dec. 16, 2021

(30) Foreign Application Priority Data
Jun. 20, 2017 (EP) .................................... 17176874

(51) Int. Cl.
*B65G 1/137* (2006.01)
*B65G 1/04* (2006.01)
(Continued)

(52) U.S. Cl.
CPC ......... *B65G 1/1375* (2013.01); *B65G 1/0407* (2013.01); *B66F 9/063* (2013.01); *B66F 9/149* (2013.01)

(58) Field of Classification Search
CPC ..... B65G 1/1375; B65G 1/0407; B66F 9/149; B66F 9/063
See application file for complete search history.

(56) References Cited

U.S. PATENT DOCUMENTS 4,678,390 A * 7/1987 Bonneton ............ B65G 1/1375
294/4
5,211,523 A * 5/1993 Andrada Galan ...... B60L 50/52
414/282

(Continued)

FOREIGN PATENT DOCUMENTS

DE 3417736 A1 11/1985
EP 0 235 488 A1 9/1987
EP 0 302 205 A2 2/1989

*Primary Examiner* — Kaitlin S Joerger
(74) *Attorney, Agent, or Firm* — Stein IP LLC

(57) ABSTRACT

The present invention relates to a robot (2) configured to pick up and transport items; wherein the robot (2) comprises a pick up unit (10), wherein the pick up unit (10) comprises a pick up device (110) configured to pick up and release items, wherein the robot (2) is configured to move the pick up device (110) along a first direction, rotate the pick up device (110) around a first axis, and extend and retract the pick up device (110) along a second direction different from the first direction; wherein the robot (2) further comprises a shelf unit (8) configured to temporarily store items, wherein the shelf unit (8) comprises a rotatable portion (80) and a support structure (84), wherein the rotatable portion (80) is rotatable with respect to the support structure (84). The present invention also relates to a use of the robot and to a corresponding method.

12 Claims, 8 Drawing Sheets

(51) Int. Cl.
*B66F 9/06* (2006.01)
*B66F 9/14* (2006.01)

(56) References Cited

U.S. PATENT DOCUMENTS

| | | | |
|---|---|---|---|
| 9,550,624 B2* | 1/2017 | Khodl | B25J 5/007 |
| 10,793,353 B2* | 10/2020 | Nakano | B65G 1/1373 |
| 2017/0121109 A1* | 5/2017 | Behling | B65G 1/0435 |
| 2018/0305124 A1* | 10/2018 | Guo | B25J 19/002 |
| 2019/0033837 A1* | 1/2019 | Zanger | B25J 18/025 |

* cited by examiner

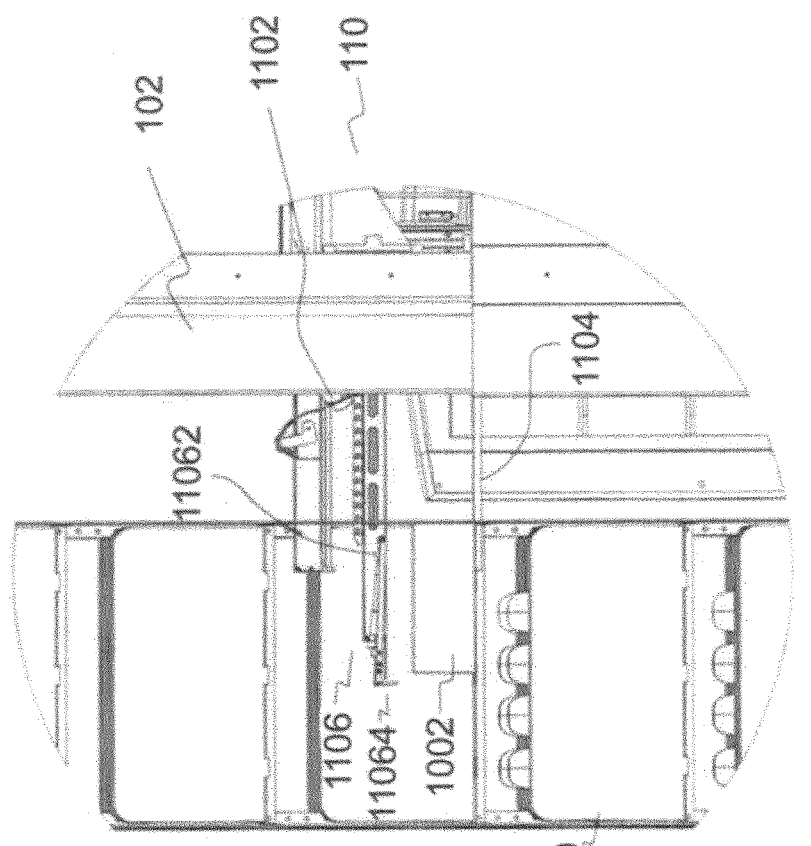
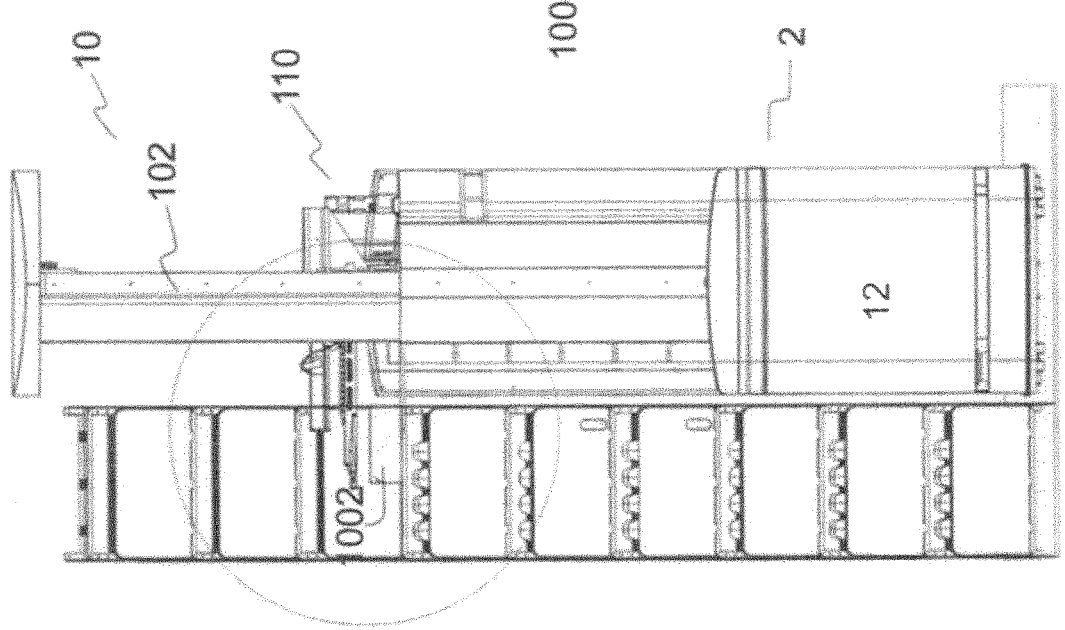
Fig. 7b
Fig. 7a

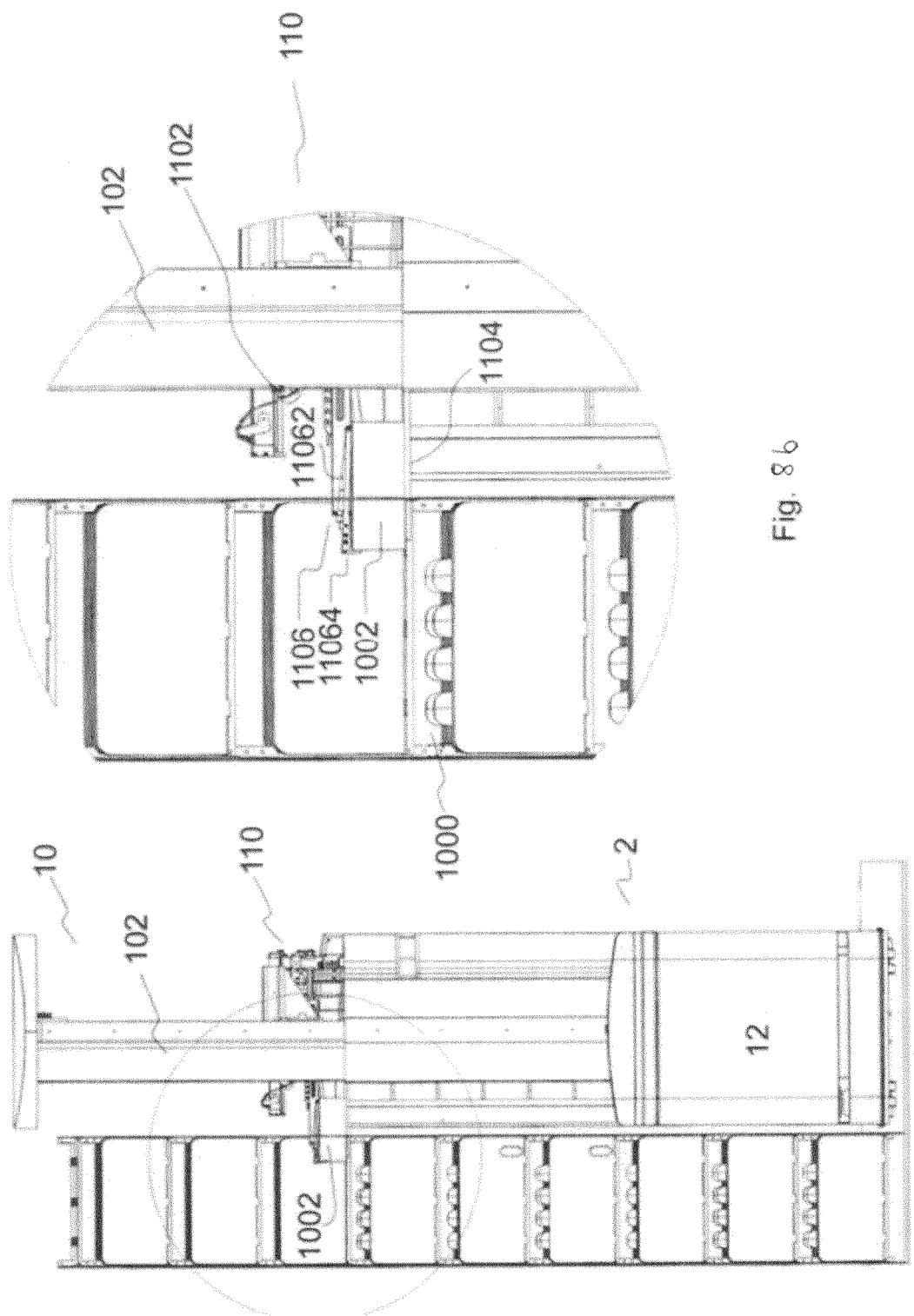

ROBOT TO PICK UP AND TRANSPORT OBJECTS, CORRESPONDING USE AND METHOD

CROSS-REFERENCE TO RELATED APPLICATIONS

This application is a national stage of International Application No. PCT/EP2018/065844, filed Jun. 14, 2018, which claims the benefit of European Application No. 17176874.0, filed Jun. 20, 2017, in the European Patent Office, the disclosures of which are incorporated herein by reference.

The present invention relates to a robot adapted to pick up and transport objects. The present invention also relates to a corresponding use and method.

A driverless conveying vehicle is known, e.g., from EP0302205A2. This document discloses a driverless conveying vehicle including shelf towers and a loading device for supplying items to the shelf towers. The loading device can rotate around a vertical axis, and can move vertically and in a horizontal direction. Thus, the loading device may be used to load items from the outside to the shelf towers.

While the vehicles of the prior art may be satisfactory in some regards, they have certain drawbacks and limitations. One of the disadvantages of prior art transport vehicles or transport robots is that their efficiency is far from optimal. That is, their space usage is far from optimal, and thus they need to travel more ways than would be necessary if the space usage was improved.

It is an object of the present invention to overcome or at least alleviate the shortcomings and disadvantages of the prior art. In particular, it is an object of the present invention to provide a robot having an improved usage of temporary storage space in the robot.

These objects are met by the present invention.

In a first embodiment, the present invention relates to a robot configured to pick up and transport items. The robot comprises a pick up unit, wherein the pick up unit comprises a pick up device configured to pick up and release items, wherein the robot is configured to move the pick up device along a first direction, rotate the pick up device around a first axis, and extend and retract the pick up device along a second direction different from the first direction. The robot further comprises a shelf unit configured to temporarily store items, wherein the shelf unit comprises a rotatable portion and a support structure, wherein the rotatable portion is rotatable with respect to the support structure.

In other words, the present invention relates to a robot that can "grip" objects (e.g., by means of a gripper or a vacuum gripper). More particularly, the robot comprises a pick up device (such as a gripper) that can grip objects and release them. The gripper is movable. More particularly, the gripper or pick up device is movable along a first, longitudinal, direction. Furthermore, the gripper may be rotated around a first axis and it may extend and retract along a second direction different to the first direction. It will be understood that this second direction can be changed, e.g., by rotation around the first axis. Thus, the pick up device may change its location and orientation to reach objects located at different positions, e.g., at different racks of an external shelf.

Furthermore, the robot according to the invention comprises a shelf unit, i.e., a unit where the robot may temporarily store items. This unit may also be referred to as a temporary storage unit. The pick up device (by means of its movability) may also reach into the shelf unit to place items into the shelf unit and take items out of the shelf unit. In particular, the pick up device may be extended into the shelf unit by a movement along the second direction. The shelf unit comprises a rotatable portion and a support structure, wherein the rotatable portion is rotatable with respect to the support structure. Thus, not only the pick up device is rotatable, but also a portion or section of the shelf unit is rotatable.

This allows the pick up unit and the shelf unit (or a portion thereof) to be co-rotated. That is, the rotatable portion of the shelf unit can be rotated, thereby allowing more items or objects to be put into the shelf unit.

This may considerably increase the storage capacity of the shelf unit and thus the robot. That is, the robot may store more items, increasing the storage efficiency. Furthermore, by doing so, the robot may have to travel fewer distances than would be required if no such rotatable shelf portion is present. The discussed robot is therefore particularly efficient with regard to space and energy usage.

The first axis may be parallel to the first direction.

The first direction may be the vertical direction. That is, the pick up device may move along the vertical direction. It should be understood that whenever terms like vertical or horizontal (or above, below) are used in this specification, such terms are understood to relate to a use-configuration of the robot.

The second direction may be perpendicular to the first direction. In certain embodiments, the second direction may be a horizontal direction.

The rotatable portion of the shelf unit may be rotatable around a shelf unit rotation axis that is parallel to the first axis. This provides a particularly simple design of the discussed robot.

The support structure may comprise a bottom support structure and the rotatable portion may be located above the bottom support structure. This may provide a particularly stable support for the rotatable portion.

The rotatable portion may comprise a plurality of case boards for supporting the items. Case boards may also be referred to as shelf boards.

The case boards may be displaceable in the vertical direction. This may render the discussed robot particularly versatile.

The shelf unit may further comprise a shelf housing that houses the case boards. Such a housing may render the robot particularly safe. First, it may limit undesired access to the case boards. Further, it may delimit the inside of the shelf unit from the outside, thereby protecting people working in the environment where the robot operates, from objects transported by the robot. Such objects may have sharp edges. By providing a shelf housing, one may delimit such objects from the outside, rendering the overall robot safer.

The rotatable portion may comprise the shelf housing.

In other words, the shelf housing may be part of the rotatable portion. In still other words, also the shelf housing may be rotatable with respect to the support structure.

The support structure may comprise the shelf housing.

That is, in this embodiment, the shelf housing is part of the support structure. In still other words, in this embodiment, the shelf housing is not rotatable, but fixed, with respect to the support structure. That is, the shelf housing may not be rotatable. That is, all the rotation occurring in the shelf unit may not be "seen" from the outside. This may render the robot even safer, as no outside movement occurs in the shelf unit that can impact a person located in the vicinity of the robot.

The support structure may comprise a top support structure located above the rotatable portion. Also having a top support structure may help to further stabilize the rotatable portion.

The support structure may further comprise support bars connecting the top support structure and the bottom support structure.

The robot may further comprise a rotation mechanism for rotating the rotatable portion with respect to the support structure.

The rotation mechanism may comprise a ball bearing comprising two rings that are rotatable with respect to each other, wherein one ring is fixedly connected to the support structure and the other ring is fixedly connected to the rotatable portion, wherein the rotation mechanism further comprises a motor for rotating the rings with respect to one another. This may provide a particularly simple and robust mechanism for rotating the rotatable portion with respect to the support structure.

One of the rings may comprise a geared circumference, and the rotation mechanism may further comprise a pinion driven by the motor and a drive belt connecting the pinion and the ring with the geared circumference.

The rotatable portion may be rotatable with respect to the support structure by at least 10°, preferably at least 20°, further preferably at least 30°. This may provide a sufficient rotation to store a plurality of objects on the same level (e.g., case board) of the shelf unit.

The rotatable portion may be rotatable with respect to the support structure by not more than 100°, preferably by not more than 70°, further preferably by not more than 40°.

In other words, the rotatable portion may be configured not to rotate more than the above angles with respect to the support structure. This may be a further safety measure of the discussed robot.

The robot may comprise a rotation delimiter for delimiting the rotation of the rotatable portion.

The rotatable portion and the support structure may have a common footprint, which may render the robot particularly compact, and allowing its operation in environment with limited space.

The footprint of the rotatable portion and the support structure may have an overlap of at least 50%, preferably at least 70%, further preferably at least 90%, such as 100%, of the footprint of the rotatable portion.

The robot may be configured to assume a configuration having a height in the range of 150 cm to 350 cm, preferably 200 to 300 cm, more preferably 250 cm to 270 cm, such as 260 cm. This may allow the robot to cooperate with human workers, while still allowing the robot to reach objects located at a relatively great height.

The robot may comprise at least one bar, and preferably a plurality of bars, such as two bars, disposed along the first direction, and the pick up device may be movable along the at least one bar.

The at least one bar may be telescopable between a retracted and an extended configuration. This may allow the robot to reach objects at relatively great heights, while still allowing the robot to go underneath relatively low clearances. This may increase the areas and locations where the robot can be operated in.

The difference between the most extended and the most retracted position may be in the range of 50 to 150 cm, preferably 70 cm to 110 cm and further preferably 80 cm to 95 cm, such as 87 cm.

The robot may comprise a base plate and a pick up unit support plate, and the pick up unit support plate may be rotatable with respect to the base plate, and the at least one bar may be mounted on the pick up unit support plate.

Thus, the rotatability of the pick up device around the first axis may be realized.

The base plate may also support the shelf unit.

The pick up unit may further comprise a pick up unit housing that houses the pick up device. This may have advantages corresponding to the advantages discussed above with respect to the shelf housing, i.e., it may increase the safety of the robot.

The pick up unit housing may also house the at least one bar.

The base plate may comprise a downward facing surface adapted to face to the ground in use and an upward facing surface opposite to the downward facing surface, and the upward facing surface in use may be distanced from the ground by a distance in the range of 15 to 70 mm, preferably 30 to 40 mm, more preferably 33 to 35 mm, such as 34 mm. That is, the upper surface of the base plate may be located relatively close to the ground, thus allowing the robot to reach objects located relatively close to the ground level.

The rotatable portion may have a vertical height of 50 cm to 200 cm, preferably 100 cm to 160 cm, more preferably 120 cm to 140 cm.

The robot may have a width in the range of 30 to 100 cm, preferably 40 to 80 cm, more preferably 50 to 70 cm, such as 60 cm.

In another embodiment, the pick up unit may comprise a top plate and a pick up section comprising the pick up device, and the pick up section may be rotatable with respect to the top plate and the top plate may be located above the pick up section.

Thus, the rotatability around the first axis may be realized.

In this embodiment, a suspension type pick up unit is provided. That is, in such an embodiment, the pick up unit is not supported from below, but only from above. Put differently still, there may be no portion of the robot located underneath the pick up section. Thus, the pick up section may reach all the way to the ground to thereby reach objects located very close to the ground, or, in fact, on the ground level.

In such an embodiment, the top plate may be connected to the at least one bar.

In such an embodiment, the pick up section may further comprise a housing that houses the pick up device. This may have advantages corresponding to the ones discussed above.

In such an embodiment, the robot may not comprise a section positioned underneath the pick up section and in the footprint of the pick up section.

In such an embodiment, the rotatable portion may have a vertical height of 60 cm to 250 cm, preferably 120 cm to 200 cm, more preferably 140 cm to 180 cm.

In such an embodiment, the robot may have a width in the range of 40 to 160 cm, preferably 60 to 140 cm, more preferably 80 to 120 cm, such as 100 cm.

Generally, the robot may comprise a center of mass, which in use is distanced from the ground by a distance in the range of 20 cm to 100 cm, preferably 30 cm to 50 cm, more preferably 35 cm to 45 cm, such as 39 cm.

The robot may be a freely moving robot. That is, the robot may be free to move to any location, without its location being limited.

The robot may be an autonomous robot. That is, the robot may be operated without any human interaction.

The present invention also relates to the use of the discussed robot to pick up and transport objects.

Further still, the present invention relates to a method to pick up and transport items. The method uses the discussed robot and comprises: the robot travelling to a first shelf; the robot picking up a first item by means of the pick up unit; and the robot transferring the first item to the shelf unit after the robot picking up the first item.

That is, the robot discussed above is used in a method. Herein, the robot picks up an item and transfers the item into the shelf unit of the robot. It will be understood that this may have advantages corresponding to the advantages discussed above with regard to the robot.

It should be understood that the term "first" (e.g., first shelf or first item) should not be understood to limit the scope of present invention, and that such terms are used interchangeable with "a" shelf or "an" item, and are merely used to differentiate such shelfs or items from other shelfs or items used in this specification. That is, e.g., the "first item" referred to above does not necessarily have to be the first item being transported by the robot. Instead, it is also possible that the robot is already transporting an item before the step of the robot transferring the "first" item to the shelf unit.

The method may comprise the pick up device being rotated around the first axis after the robot picking up the first item and before the robot transferring the first item to the shelf unit.

That is, the robot may pick up the item in a first rotational configuration and may transfer the item from the pick up unit to the shelf unit in a second rotational configuration.

In embodiments, the connection between the first axis and the shelf unit rotation axis defines a connection line. In such embodiments, in the step of the robot transferring the first item to the shelf unit, the pick up device may extend along the second direction, and, in this step, the second direction may be different from the connection line by a rotation angle, and further in the step of the robot transferring the first item to the shelf unit, the rotatable portion of the shelf unit may be rotated from a rest position of the rotatable portion by the rotation angle.

In other words, in the transferring step, the pick up device and the rotatable portion of the shelf unit are rotated by the same angle with regard to rest positions. Such "co-rotation" may lead to a particularly simple and space-saving storage.

The rest position of the rotatable portion of the shelf unit may be symmetrical with respect to a plane defined by the connection line and the first axis.

This may lead to a particularly simple and apt design of the robot.

The method may further comprise the robot picking up a second item by means of the pick up unit; and the robot transferring the second item to the shelf unit after the robot picking up the second item; wherein in the step of the robot transferring the first item to the shelf unit, the first item is placed on a case board, and in the step of the robot transferring the second item to the shelf unit, the second item is placed on said case board, while the first item is located on said case board.

That is, in this embodiment of the method, multiply items are stored on the same case. This may again allow for a particularly efficient storage of items in the robot.

The first item and the second item may be regularly shaped objects and the second item may be placed on said case board parallel to the first item.

Examples for regularly shaped objects include, e.g., books or boxes (such as boxes for shoes).

The method may further comprise the rotatable portion of the shelf unit being rotated with respect to the support structure, wherein said rotation of the rotatable portion is performed after the step of the robot transferring the first item to the shelf unit and before the step of the robot transferring the second item to the shelf unit.

In embodiments, the connection between the first axis and the shelf unit rotation axis defines a connection line. In such embodiments, in the step of the robot transferring the first item to the shelf unit, the pick up device may assume a first pick up device angle configuration with respect to the connection line and the rotatable portion may assume a first shelf angle configuration with respect to the connection line, and in the step of the robot transferring the second item to the shelf unit, the pick up device may assume a second pick up device angle configuration with respect to the connection line and the rotatable portion may assume a second shelf angle configuration with respect to the connection line, wherein the second pick up device angle configuration differs from the first pick up device angle configuration by a pick up device difference angle, the second shelf angle configuration differs from the first shelf angle configuration by a shelf difference angle, and the pick up device difference angle equals the shelf difference angle.

That is, there is an angle difference of the pick up unit between the first and second configuration and there is an angle difference of the shelf unit between the first and second configuration. These angle differences are equal to one another. This may allow for a particularly simple process of storing the different objects on a case board of the shelf unit.

The method may further comprise the robot picking up a third item by means of the pick up unit; and the robot transferring the third item to the shelf unit after the robot picking up the second item; wherein in the step of the robot transferring the third item to the shelf unit, the third item is placed on said case board, while the first item and the second item are located on said shelf board.

That is, the present method may not only allow two items to be placed side by side on a shelf board of the shelf unit, but may also allow three (or more) items to be placed on a shelf board. It will be understood that this may help to increase the storage efficiency of the robot.

The third item may be a regularly shaped object and the third item may placed on said case board parallel to the first item and to the second item.

The method may further comprise an additional rotation of the rotatable portion of the shelf unit with respect to the support structure, wherein said additional rotation of the rotatable portion is performed after the step of the robot transferring the second item to the shelf unit and before the step of the robot transferring the third item to the shelf unit, wherein said additional rotation leads to a configuration of the rotatable portion with respect to the support structure that is different from the configuration while the robot transfers the first item to the shelf unit and different from the configuration while the robot transfers the second item to the shelf unit.

In some embodiments, in the step of the robot transferring the third item to the shelf unit, the pick up device may assume a third pick up device angle configuration with respect to the connection line and the rotatable portion may assume a third shelf angle configuration with respect to the connection line, wherein the third pick up device angle configuration differs from the first pick up device angle configuration by a second pick up device difference angle, the third shelf angle configuration differs from the first shelf angle configuration by a second shelf difference angle, and the second pick up device difference angle equals the second shelf difference angle.

The present invention also relates to the robot discussed above, wherein the robot is configured to carry out the method discussed above.

The present invention also relates to the below discussed numbered embodiments.

Below, robot embodiments will be discussed. These embodiments are denoted by the letter "R" followed by a number. When reference is herein made to "robot embodiments", these embodiments are meant.

R1. A robot configured to pick up and transport items;
   wherein the robot comprises a pick up unit, wherein the pick up unit comprises a pick up device configured to pick up and release items, wherein the robot is configured to move the pick up device along a first direction, rotate the pick up device around a first axis, and extend and retract the pick up device along a second direction different from the first direction;
   wherein the robot further comprises a shelf unit configured to temporarily store items, wherein the shelf unit comprises a rotatable portion and a support structure, wherein the rotatable portion is rotatable with respect to the support structure.

R2. The robot according to the preceding embodiment, wherein the first axis is parallel to the first direction.

R3. The robot according to any of the preceding embodiments, wherein the first direction is the vertical direction.

R4. The robot according to any of the preceding embodiments, wherein the second direction is perpendicular to the first direction.

R5. The robot according to any of the preceding embodiments, wherein the rotatable portion of the shelf unit is rotatable around a shelf unit rotation axis that is parallel to the first axis.

R6. The robot according to any of the preceding embodiments, wherein the support structure comprises a bottom support structure and wherein the rotatable portion is located above the bottom support structure.

R7. The robot according to any of the preceding embodiments, wherein the rotatable portion comprises a plurality of case boards for supporting the items.

R8. The robot according to the preceding embodiment, wherein the case boards are displaceable in the vertical direction.

R9. The robot according to any of the 2 preceding embodiments, wherein the shelf unit further comprises a shelf housing that houses the case boards.

R10. The robot according to the preceding embodiment, wherein the rotatable portion comprises the shelf housing.

In other words, the shelf housing may be part of the rotatable portion. In still other words, also the shelf housing may be rotatable with respect to the support structure.

R11. The robot according to the penultimate embodiment, wherein the support structure comprises the shelf housing.

That is, in this embodiment, the shelf housing is part of the support structure. In still other words, in this embodiment, the shelf housing is not rotatable, but fixed, with respect to the support structure.

R12. The robot according to any of the preceding embodiments, wherein the support structure comprises a top support structure located above the rotatable portion.

R13. The robot according to the preceding embodiment and with the features of embodiment R6, wherein the support structure further comprises support bars connecting the top support structure and the bottom support structure.

R14. The robot according to any of the preceding embodiments, wherein the robot further comprises a rotation mechanism for rotating the rotatable portion with respect to the support structure.

R15. The robot according to the preceding embodiment, wherein the rotation mechanism comprises a ball bearing comprising two rings that are rotatable with respect to each other, wherein one ring is fixedly connected to the support structure and the other ring is fixedly connected to the rotatable portion, wherein the rotation mechanism further comprises a motor for rotating the rings with respect to one another.

R16. The robot according to the preceding embodiment, wherein one of the rings comprises a geared circumference, and wherein the rotation mechanism further comprises a pinion driven by the motor and a drive belt connecting the pinion and the ring with the geared circumference.

R17. The robot according to any of the preceding embodiments, wherein the rotatable portion is rotatable with respect to the support structure by at least 10°, preferably at least 20°, further preferably at least 30°.

R18. The robot according to any of the preceding embodiments, wherein the rotatable portion is rotatable with respect to the support structure by not more than 100°, preferably by not more than 70°, further preferably by not more than 40°.

In other words, the rotatable portion is configured not to rotate more than the above angles with respect to the support structure.

R19. The robot according to any of the preceding embodiments, wherein the robot comprises a rotation delimiter for delimiting the rotation of the rotatable portion.

R20. The robot according to any of the preceding embodiments, wherein the rotatable portion and the support structure have a common footprint.

R21. The robot according to the preceding embodiment, wherein the footprint of the rotatable portion and the support structure have an overlap of at least 50%, preferably at least 70%, further preferably at least 90%, such as 100%, of the footprint of the rotatable portion.

R22. The robot according to any of the preceding embodiments, wherein the robot is configured to assume a configuration having a height in the range of 150 cm to 350 cm, preferably 200 to 300 cm, more preferably 250 cm to 270 cm, such as 260 cm.

R23. The robot according to any of the preceding embodiments, wherein the robot comprises at least one bar, and preferably a plurality of bars, such as two bars, disposed along the first direction, and wherein the pick up device is movable along the at least one bar.

R24. The robot according to the preceding embodiment, wherein the at least one bar is telescopable between a retracted and an extended configuration.

R25. The robot according to the preceding embodiment, wherein the difference between the most extended and the most retracted position is in the range of 50 to 150 cm, preferably 70 cm to 110 cm and further preferably 80 cm to 95 cm, such as 87 cm.

R26. The robot according to any of the preceding embodiments and with the features of embodiment R23, wherein the robot comprises a base plate and a pick up unit support plate, wherein the pick up unit support plate is rotatable with respect to the base plate, and wherein the at least one bar is mounted on the pick up unit support plate.

Thus, the rotatability of the pick up device around the first axis may be realized.

R27. The robot according to the preceding embodiment, wherein the base plate also supports the shelf unit.

R28. The robot according to any of the preceding embodiments, wherein the pick up unit further comprises a pick up unit housing that houses the pick up device.

R29. The robot according to the preceding embodiment and with the features of embodiment R23, wherein the pick up unit housing also houses the at least one bar.

R30. The robot according to any of the preceding embodiments and with the features of embodiment R26, wherein the base plate comprises a downward facing surface adapted to face to the ground in use and an upward facing surface opposite to the downward facing surface, wherein the upward facing surface in use is distanced from the ground by a distance in the range of 15 to 70 mm, preferably 30 to 40 mm, more preferably 33 to 35 mm, such as 34 mm.

R31. The robot according to any of the preceding embodiments, wherein the rotatable portion has a vertical height of 50 cm to 200 cm, preferably 100 cm to 160 cm, more preferably 120 cm to 140 cm.

R32. The robot according to any of the preceding embodiments, wherein the robot has a width in the range of 30 to 100 cm, preferably 40 to 80 cm, more preferably 50 to 70 cm, such as 60 cm.

R33. The robot according to any of the embodiments R1 to R25, wherein the pick up unit comprises a top plate and a pick up section comprising the pick up device, wherein the pick up section is rotatable with respect to the top plate and wherein the top plate is located above the pick up section.

Thus, the rotatability around the first axis may be realized.

R34. The robot according to the preceding embodiment and with the features of embodiment R23, wherein the top plate is connected to the at least one bar.

R35. The robot according to any of the 2 preceding embodiments, wherein the pick up section further comprises a housing that houses the pick up device.

R36. The robot according to any of the preceding 3 embodiments, wherein the robot does not comprise a section positioned underneath the pick up section and in the footprint of the pick up section.

R37. The robot according to any of the preceding 4 embodiments, wherein the rotatable portion has a vertical height of 60 cm to 250 cm, preferably 120 cm to 200 cm, more preferably 140 cm to 180 cm.

R38. The robot according to any of the preceding 5 embodiments, wherein the robot has a width in the range of 40 to 160 cm, preferably 60 to 140 cm, more preferably 80 to 120 cm, such as 100 cm.

R39. The robot according to any of the preceding embodiments, wherein the robot comprises a center of mass, which in use is distanced from the ground by a distance in the range of 20 cm to 100 cm, preferably 30 cm to 50 cm, more preferably 35 cm to 45 cm, such as 39 cm.

R40. The robot according to any of the preceding embodiments, wherein the robot is a freely moving robot.

R41. The robot according to any of the preceding embodiments, wherein the robot is an autonomous robot.

Below, use embodiments will be discussed. These embodiments are denoted by the letter "U" followed by a number. When reference is herein made to "use embodiments", these embodiments are meant.

U1. Use of the robot according to any of the preceding robot embodiments to pick up and transport objects.

Below, method embodiments will be discussed. These embodiments are denoted by the letter "M" followed by a number. When reference is herein made to "method embodiments", these embodiments are meant.

M1. A method to pick up and transport items, the method using the robot according to any of the preceding robot embodiments, the method comprising
 the robot travelling to a first shelf;
 the robot picking up a first item by means of the pick up unit;
 the robot transferring the first item to the shelf unit after the robot picking up the first item.

M2. The method according to the preceding embodiment, wherein the method comprises
 the pick up device being rotated around the first axis after the robot picking up the first item and before the robot transferring the first item to the shelf unit.

M3. The method according to any of the preceding method embodiments, wherein the robot comprises the features of embodiment R5 and wherein the connection between the first axis and the shelf unit rotation axis defines a connection line;
 wherein in the step of the robot transferring the first item to the shelf unit, the pick up device extends along the second direction, wherein, in this step, the second direction is different from the connection line by a rotation angle,
 and further wherein in the step of the robot transferring the first item to the shelf unit, the rotatable portion of the shelf unit is rotated from a rest position of the rotatable portion by the rotation angle.

M4. The method according to the preceding embodiment, wherein the rest position of the rotatable portion of the shelf unit is symmetrical with respect to a plane defined by the connection line and the first axis.

M5. The method according to any of the preceding method embodiments, wherein the robot comprises the features of embodiment R7, wherein the method further comprises
 the robot picking up a second item by means of the pick up unit; and
 the robot transferring the second item to the shelf unit after the robot picking up the second item;
 wherein
 in the step of the robot transferring the first item to the shelf unit, the first item is placed on a case board, and
 in the step of the robot transferring the second item to the shelf unit, the second item is placed on said case board, while the first item is located on said shelf board.

M6. The method according to the preceding embodiment, wherein the first item and the second item are regularly shaped objects and wherein the second item is placed on said case board parallel to the first item.

Examples for regularly shaped objects include, e.g., books or boxes (such as boxes for shoes).

M7. The method according to any of the 2 preceding embodiments, wherein the method further comprises
 the rotatable portion of the shelf unit being rotated with respect to the support structure,
 wherein said rotation of the rotatable portion is performed after the step of the robot transferring the first item to the shelf unit and before the step of the robot transferring the second item to the shelf unit.

M8. The method according to the preceding embodiment, wherein the robot comprises the features of embodiment R5 and wherein the connection between the first axis and the shelf unit rotation axis defines a connection line, wherein
 in the step of the robot transferring the first item to the shelf unit, the pick up device assumes a first pick up device angle configuration with respect to the connection line and the rotatable portion assumes a first shelf angle configuration with respect to the connection line, and in the step of the robot transferring the second item to the shelf unit, the pick up device assumes a second pick up device angle configuration with respect to the connection line and the rotatable portion assumes a second shelf angle configuration with respect to the connection line, wherein the second pick up device angle configuration differs from the first pick up device angle configuration by a pick up device difference angle, the second shelf angle configuration differs from the first shelf angle configuration by a shelf difference angle, and wherein the pick up device difference angle equals the shelf difference angle.

M9. The method according to any of the preceding 4 embodiments, wherein the method further comprises the robot picking up a third item by means of the pick up unit; and the robot transferring the third item to the shelf unit after the robot picking up the second item;

wherein in the step of the robot transferring the third item to the shelf unit, the third item is placed on said case board, while the first item and the second item are located on said shelf board.

M10. The method according to the preceding embodiment and with the feature of embodiment M6, wherein the third item is a regularly shaped object and wherein the third item is placed on said case board parallel to the first item and to the second item.

M11. The method according to any of the preceding 2 embodiments and with the features of embodiment M7, wherein the method further comprises an additional rotation of the rotatable portion of the shelf unit with respect to the support structure, wherein said additional rotation of the rotatable portion is performed after the step of the robot transferring the second item to the shelf unit and before the step of the robot transferring the third item to the shelf unit, wherein said additional rotation leads to a configuration of the rotatable portion with respect to the support structure that is different from the configuration while the robot transfers the first item to the shelf unit and different from the configuration while the robot transfers the second item to the shelf unit.

M12. The method according to the any of the preceding method embodiments and with the features of embodiment M8 and M9, wherein in the step of the robot transferring the third item to the shelf unit, the pick up device assumes a third pick up device angle configuration with respect to the connection line and the rotatable portion assumes a third shelf angle configuration with respect to the connection line, and wherein the third pick up device angle configuration differs from the first pick up device angle configuration by a second pick up device difference angle, the third shelf angle configuration differs from the first shelf angle configuration by a second shelf difference angle, and wherein the second pick up device difference angle equals the second shelf difference angle.

R42. The robot according to any of the preceding robot embodiment, wherein the robot is configured to carry out the method according to any of the preceding method embodiments.

Embodiments of the present invention will now be described with reference to the accompanying drawings, which are intended to exemplify, but not to limit, the scope of the present invention.

Figure 9:
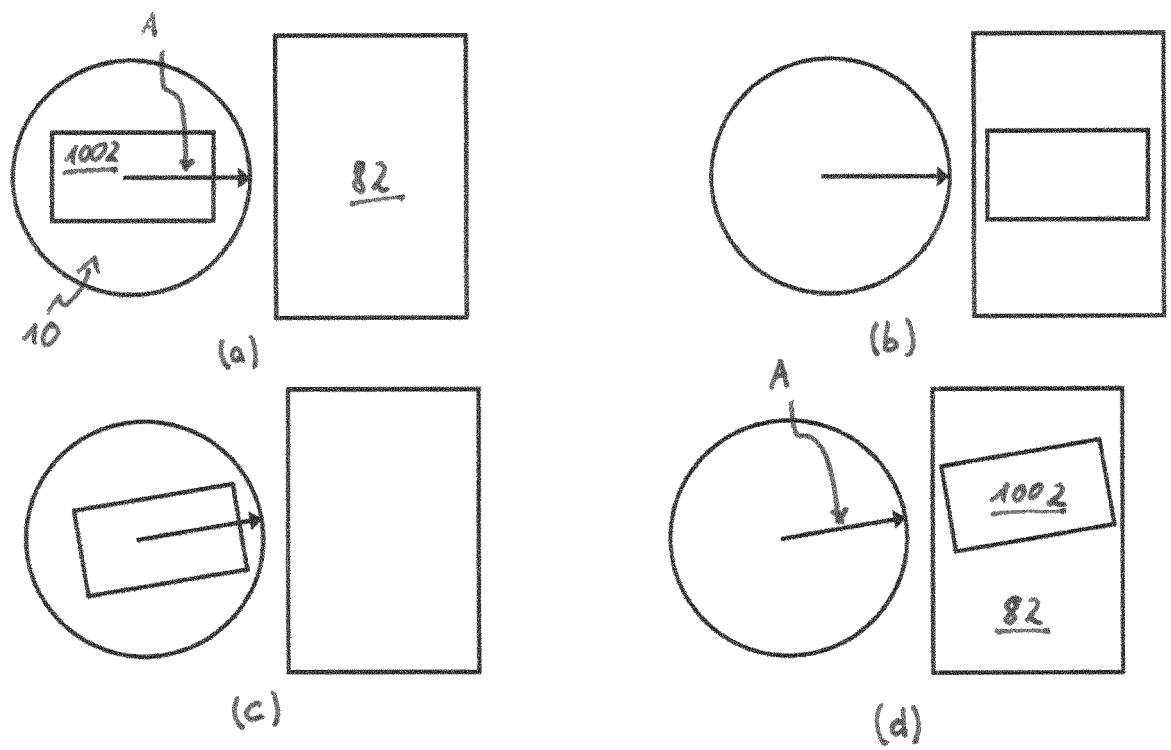
Figure 10:
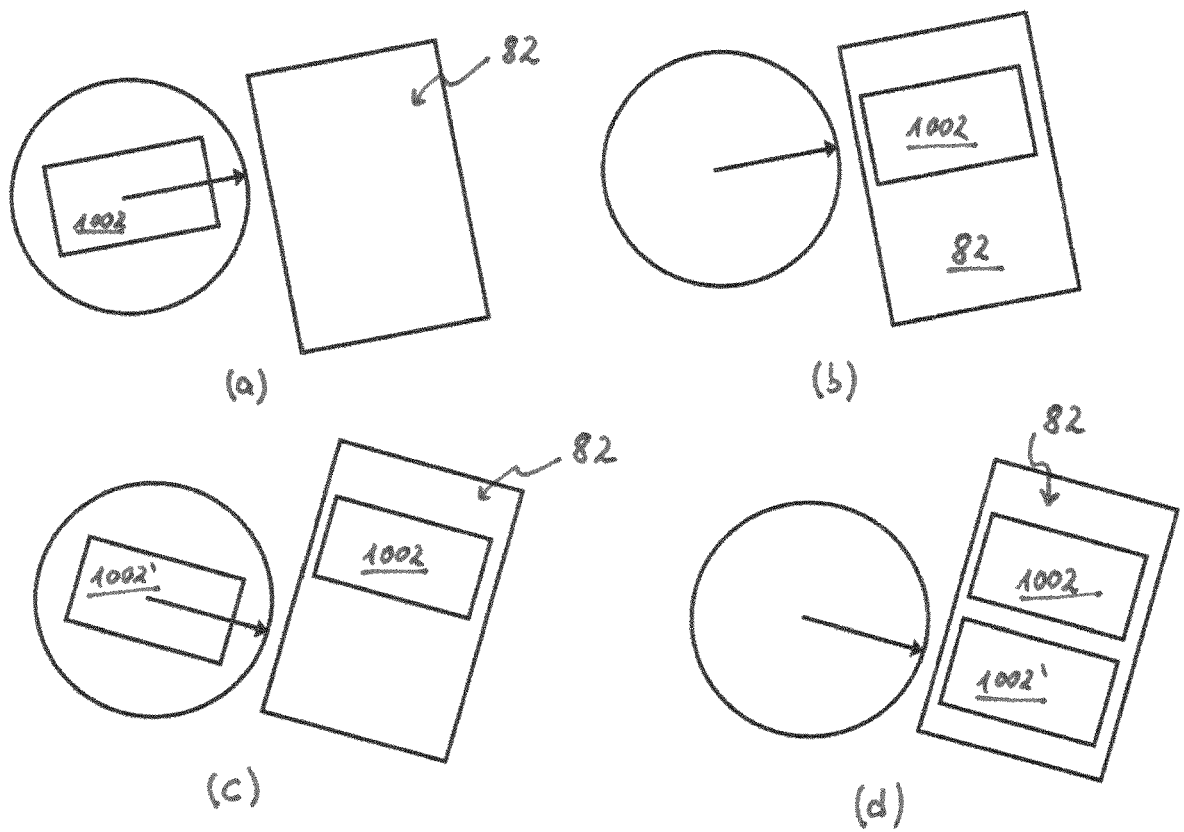
Figure 12:
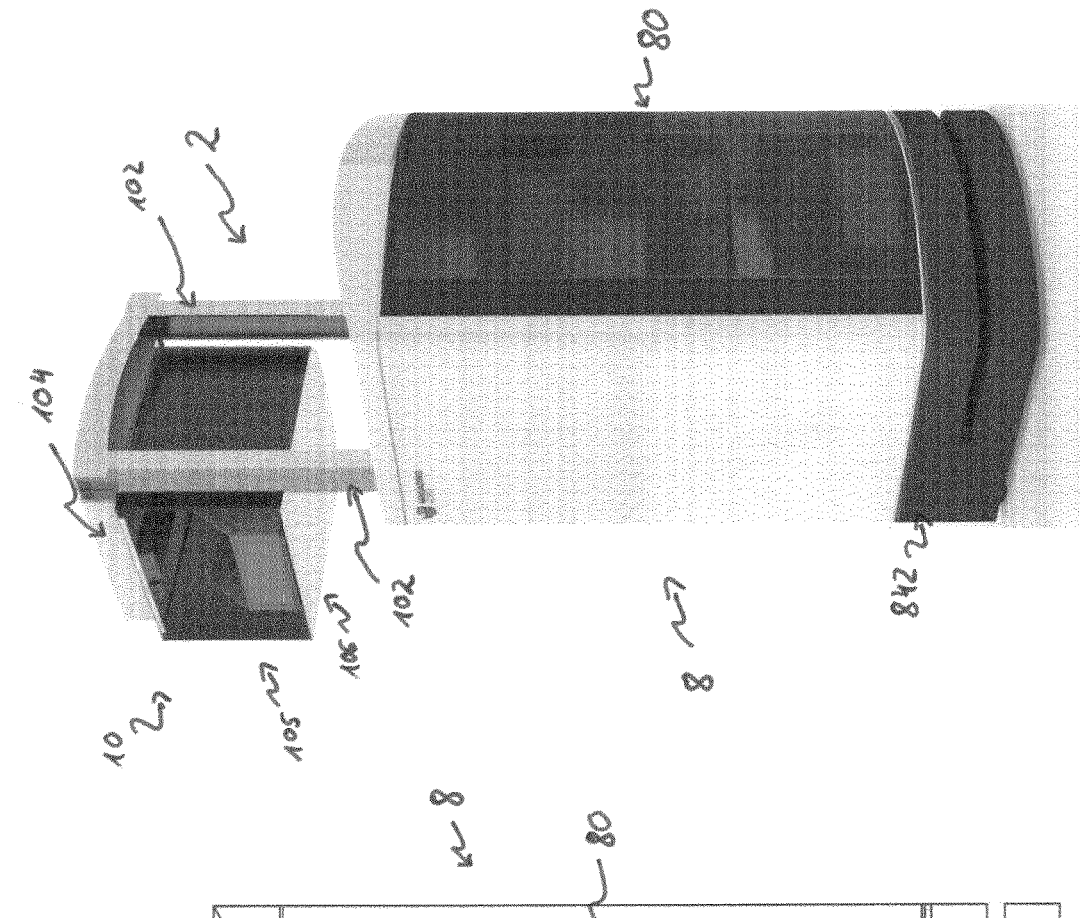
Figure 11:
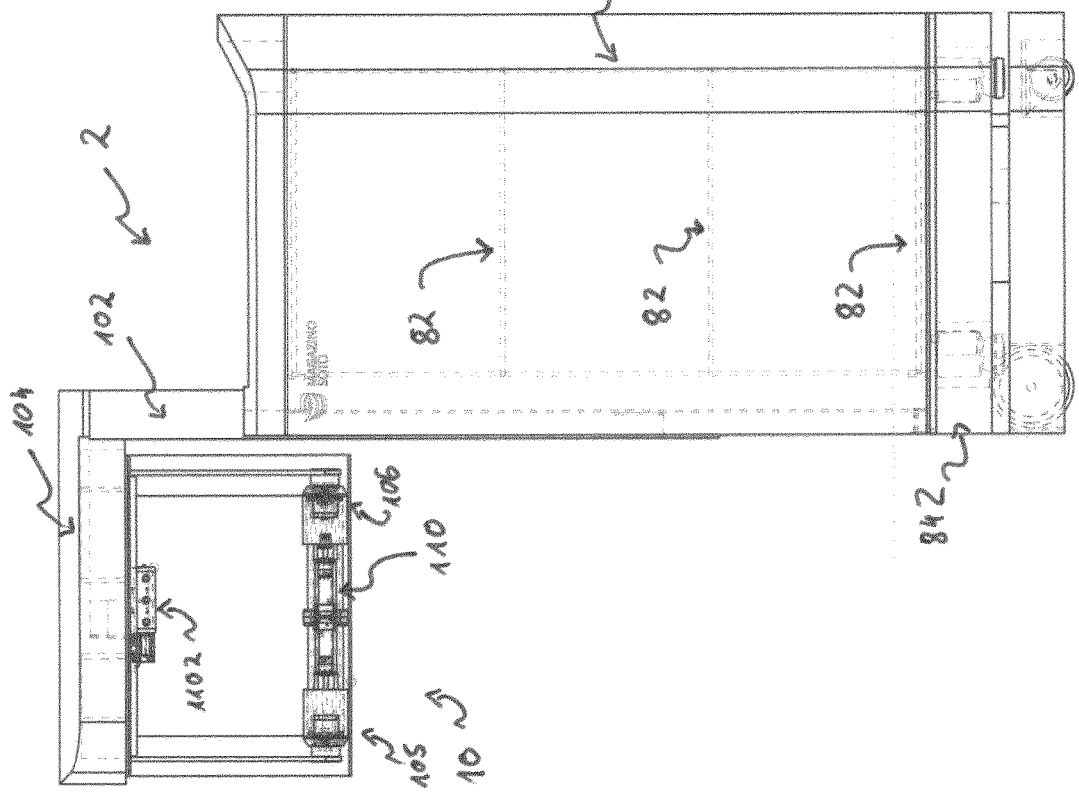

FIGS. 7*a* and 7*b* illustrate a pick up mechanism of embodiments of the present invention;

FIGS. 8*a* and 8*b* also illustrate a pick up mechanism of embodiments of the present invention;

FIGS. 9 and 10 schematically illustrate rationales for loading a shelf unit;

FIG. 11 depicts a side view of a robot according to another embodiment of the present invention; and FIG. 12 depicts a perspective view of the robot of FIG. 11.

Figure 1:
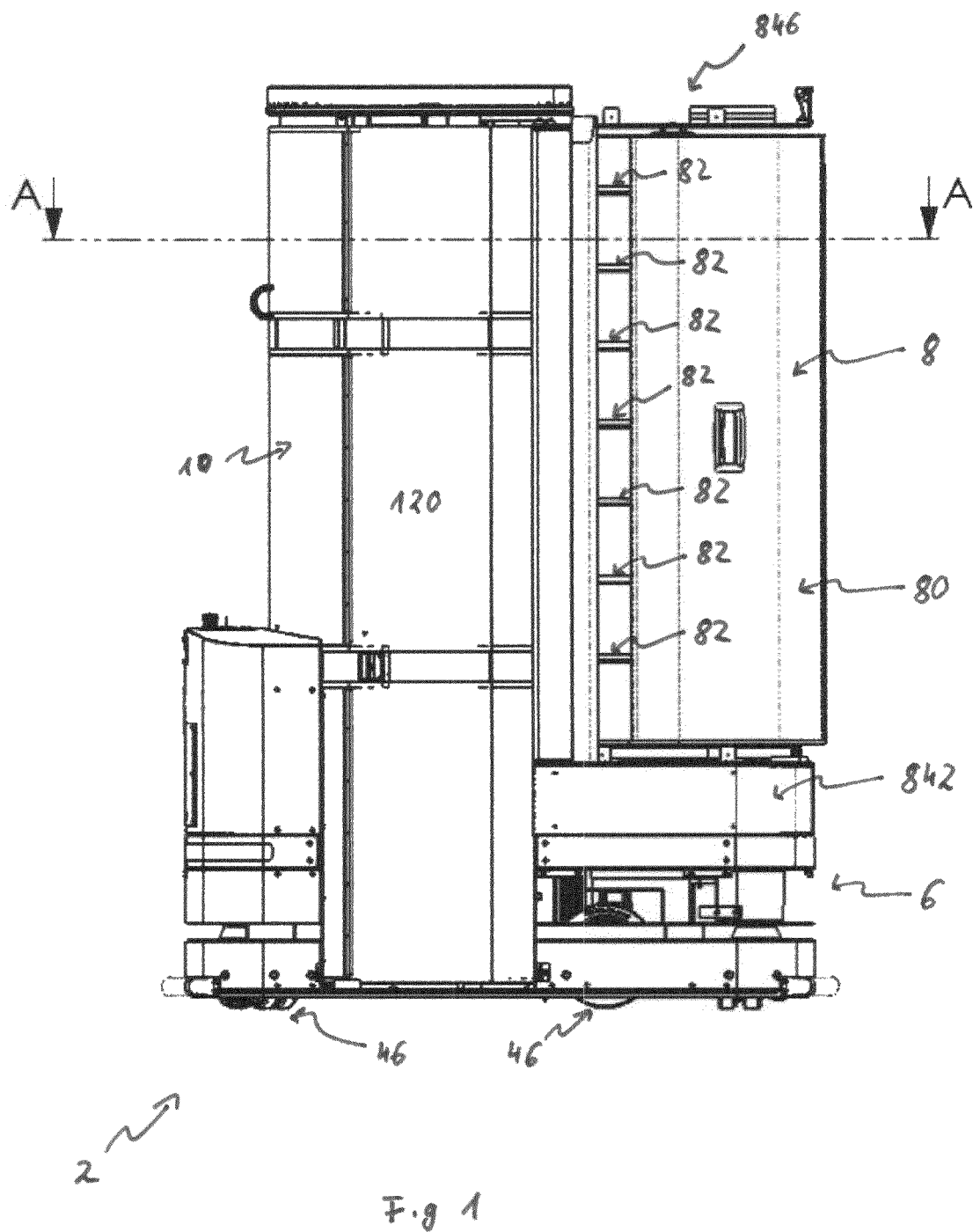
FIG. 1 depicts a side view of a robot according to embodiments of the present invention.

FIG. 1 depicts an embodiment of a robot 2 according to embodiments of the present invention. The robot 2 is configured to travel freely. That is, the robot 2 is configured to reach any location in an environment where the robot 2 operates in. That is, the robot 2 may be configured not to follow predetermined paths in its environment, but to travel freely.

The robot 2 may comprise an energy storage unit (such as a battery unit), a drive unit 6, as well as one or more wheels 46.

The robot 2 may be configured to pick up and transport objects or items. In general terms, the robot 2 may comprise different units. In particular, the robot 2 may comprise a pick up unit 10 and a shelf unit 8. The pick up unit 10 is configured to pick up items and the shelf unit 8 may be configured to intermediately store items. That is, the robot 2 may pick up an item by means of the pick up unit 10 and may store the item in shelf unit 8, which shelf unit 8 may therefore also be referred to as intermediate storage unit. In particular, the shelf unit 8 may comprise a plurality of case boards 82 positioned in different vertical positions. Whenever reference herein is made to terms like vertical and horizontal (or top and bottom), these terms are understood in an in-use configuration, where the robot 2 is in its intended configuration having its, e.g., wheels contacting the ground.

Figure 2:
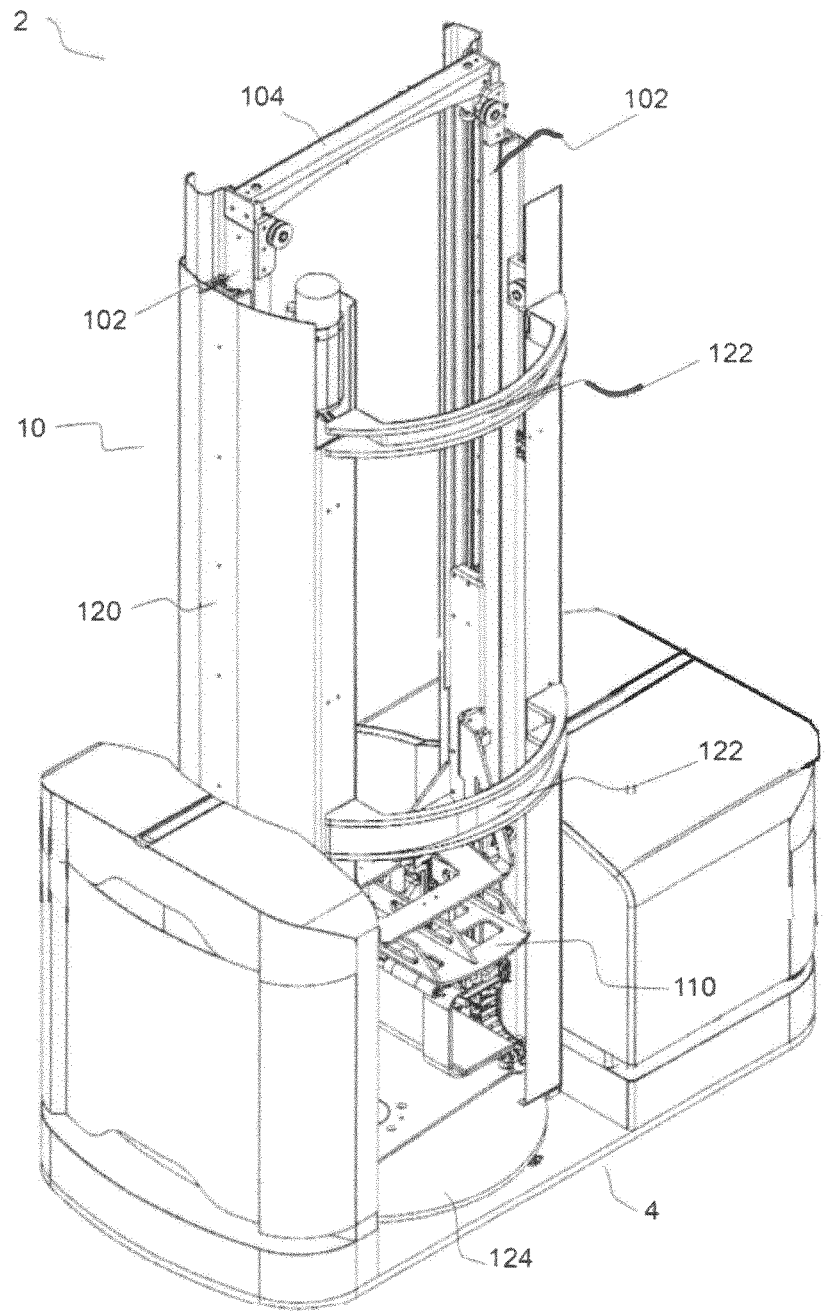
FIG. 2 depicts a perspective view of sections of a robot according to embodiments of the present invention.

The pick up unit 10 is configured to pick up items. Further details of an exemplary pick up unit 10 are depicted in FIG. 2, which FIG. 2 depicts an embodiment of a robot 2 (or parts thereof), where the shelf unit 8 has been omitted for clarity of illustration. The pick up unit 10 comprises a pick up device 110 adapted to grip objects. Furthermore, the pick up unit 10 is configured to move the pick up device 110 in a vertical direction, to rotate it around a vertical axis and to move it in a horizontal direction.

The pick up unit 10 may also comprise a housing 120. This housing is only partially depicted in FIG. 2, to expose the further components of the pick up unit 10, but is visible in FIG. 1. The housing may delimit the pick up unit 10 and may separate other components (and in particular the pick up device 110) from the outside. This may render the robot 2 safer, which may be particularly advantageous when the robot 2 is operated in an environment where also humans are present. In particular, the pick up device 110 may only extend from the inside of the housing 120 when gripping an object, but otherwise (and in particular, while the robot 2 is travelling) be positioned inside the housing 120.

Again with primary reference to FIG. 2, the pick up 10 unit comprises at least one bar 102, and preferably two bars 102, and the pick up device 110 is configured to move along this at least one bar 102 in a vertical direction. Thus, the pick up device 110 may assume different vertical positions and may thereby reach different case boards of an external shelf where items are stored in and may also reach different case boards 82 of the shelf unit 8 of the robot 2. In some embodiments, the at least one bar 102 may also be telescopable between at least a retracted and an extended configuration. This may allow the robot 2 to pick up objects at greater heights, while still allowing the robot 2 to travel underneath low clearances, and may therefore improve the usability of the robot 2. The pick up unit 10 may also comprise one or more connector members 122 connecting the bars 102 (e.g., for stability reasons) and a connection bar 104 connecting the bars 102 at their top end.

As regards the rotation around a vertical axis, the pick up unit 10 comprises a pick up unit support plate 124, which is rotatable with respect to a base plate 4 of the robot 2. The at least one bar 102 is supported by the pick up unit support plate 124. Thus, rotation of the pick up unit support plate 124 also leads to rotation of the pick up device 110. By means of such a mechanism, the pick up device 110 may be rotatable with respect to a vertical axis.

Further details of the pick up device 110 will now be described with reference to FIGS. 7a to 8b. There may be provided a sensor assembly 1102 on the pick up device 110 adapted to sense the exact location of an object 1002 to be picked up. Typically, such a sensor assembly 1002 could comprise at least one camera. The camera may be, for example, a 3D camera or a camera including a depth sensor. By means of such a sensor assembly 1102, the exact location of the object 1002 to be picked up may be sensed. The pick up device 110 may be primarily adapted to pick up regularly shaped objects 1002, such as boxes, books and/or DVDs. As depicted, e.g., in FIGS. 7b and 8b, which are enlarged views of a section of FIGS. 7a and 8a, respectively, the pick up device 110 may comprise a support plate 1104 and a pulling assembly 1106. The support plate 1104 is disposed substantially horizontally. According to one embodiment, it may be extended in a horizontal direction. Thus, it may be placed under the rack of the shelf where the object 1002 to be picked up is located. It may also be placed on level with the rack of the shelf where the object 1002 to be picked up is located and directly adjacent to this rack. The pulling assembly 1106 comprises a substantially horizontal portion 11062 and a vertical extension 11064 on the distal end of the horizontal portion 11062. The vertical extension 11064 extends downwards from the horizontal portion 11062. The horizontal portion 11062 is extendable and retractable between extended and retracted configurations. Furthermore, the vertical distance between the support plate 1104 and the pulling assembly 1106 is adjustable. To pick up object 1002, the exact location of the object 1002 is sensed by means of sensor assembly 1102, the support plate 1104 is moved to a location under the rack the object 1002 is located on or directly adjacent to said rack. The pulling assembly 1006 is positioned on a vertical position allowing the pulling assembly 1006 to be extended further than the distal end of the object 1002 and the pulling assembly 1006 is extended in such a way (see FIGS. 7a and 7b). The pulling assembly 1006 is then lowered to a point where the vertical extension 11064 may abut the distal end of the object 1002 and the pulling assembly 1106 is retracted (see FIGS. 8a and 8b). This causes the object 1002 to slide onto support plate 1104. The pick up device 110 including the support plate 1104 and the pulling assembly 1106 may be retracted, such that the pick up assembly 110 together with the object 1002 is retracted to a location, e.g., in between the bars 102. Thus an object or item 1002 may be picked up by means of the pick up device 110.

It will be understood that the pick up device 110 may be used in a similar way to pick up objects from the shelf unit 8 of the robot 2. Furthermore, it will also be understood that the objects may be placed from the pick up device 110 to the shelf unit 8 of the robot 2 (or to an external shelf) by an essentially correspondingly reversed method.

Further features of the robot 2, and particularly the pick up unit 10 and the exact pick up mechanism are also described in EP16151220, filed 14 Jan. 2016, which is incorporated herein by reference in its entirety.

By the described features, it is possible that the robot 2 travels to an external shelf unit, and picks up an object 1002. To do so, the robot 2 is positioned at the correct location, the pick up device 110 of the pick up unit 100 travels along the bar(s) 102 to the correct height, and the object 1002 to be picked up is picked up by the pick up device 110. To do so, the pick up device 110 extends, picks up the object 1002 and retracts back into the remainder of the robot 2. The object 1002 is then located at the pick up device 110. As long as the object 1002 is located at the pick up device 110, it may be impossible for the robot 2 to pick up another object.

If only one object 1002 is to be picked up and to be transported to a destiny location, this may be sufficient. In such a case, the robot 2 may simply travel to the destiny location while the object 1002 is located at the pick up device 110. However, in other scenarios, it may be desirable that the robot 2 transports more than one object 1002 at once. For example, when used in a fulfillment center, it may be more efficient for the robot to pick up a plurality of objects and to transport them to the destiny location (e.g., for shipping). In such scenarios, the robot 2 may put objects into the shelf unit 8, and pick up a plurality of objects.

In that regard, it is desirable that the robot 2 makes efficient usage of the storage space, i.e., of its shelf unit 8. E.g., to improve the storage efficiency, the shelf unit 8 of the robot 2 comprises at least a section or portion 80 that is rotatable. More particularly, the section 80 may be rotatable around a vertical axis.

A rationale for a rotatable portion of the shelf unit 8 is provided with reference to FIGS. 9 and 10. FIG. 9 depicts a very schematic top view of a portion of the pick up unit 10, a case board 82 of the shelf unit 8 and an object 1002 to be transferred from the pick up unit 10 to the shelf unit 8. Furthermore, arrow A indicates the direction of movement of the pick up device 100. As discussed, the pick up unit 10 is configured to rotate the pick up device 100 around a vertical axis. This is why the arrow A may rotate (cf. FIGS. 9 (*a*) and (*c*)). Typically, when transferring the object 1002 from the pick up unit 10 to a case board 82 of a shelf unit 8, the pick up unit 10 assumes a configuration where the pick up device 110 extends substantially perpendicularly into the shelf unit 8 (see FIG. 9 (*b*)). For sake of brevity and clarity of illustration, not all reference numerals are included in all of the sub-figures of FIG. 9. However, as is depicted in FIGS. 9 (*c*) and 9 (*d*), the robot 2 may (theoretically) assume other configurations than the perpendicular one to transfer objects 1002 from the pick up unit 10 to the shelf unit 8, thereby arriving at objects 1002 positioned askew on the case board 82.

In the described embodiment, in addition to the pick up device 110, also a portion of the shelf unit 8, and in particular the case boards 82, are rotatable, as depicted in FIG. 10. By co-rotating the pick up unit 10 and the shelf unit 8 (see FIG. 10), one may position different objects 1002, 1002' onto the case board 82 of the shelf unit 8. While in FIG. 10, it is depicted that two objects 1002, 1002' are positioned on one case board 82, the skilled person will understand that this embodiment also allows more than two objects 1002, 1002' to be positioned on one case board 82 (depending on the sizes of the objects and the size of the case board 82).

Having a section of the shelf unit 8 being rotatable thus significantly increases the storage capacity and storage efficiency of the robot 2. The robot 2 of this embodiment is therefore able to simultaneously transport much more objects 1002 than would have been possible with prior art solutions. Thus, the transport efficiency is increased, and the overall energy consumption per transported object reduced—as the robot 2 has to travel less often than would be necessary in case the shelf unit 8 did not have a rotatable portion 80.

In certain embodiments, the rotation of the pick up unit 10 and the rotatable portion 80 of the shelf unit 8 is the same, i.e., both entities are rotated by the same angle. This is also depicted in FIG. 10. In particular, this rotation may be measured with respect to a line connecting the rotation axis of the pick up unit 10 and the rotation axis of the rotatable portion 80 of the shelf unit 8. As discussed, the pick up device 100 may move along arrow A, which, in the configuration depicted in FIG. 10 (*a*) is at an acute angle with respect to the line connecting the discussed rotation axes. Also the rotatable portion of the shelf unit is rotated by this angle with respect to its rest position, e.g., a position being symmetrical with respect to the connection line of the discussed axes. This may allow for a particularly simple and space-saving storing of the items 1002. It is noted that the same rationale is present throughout FIGS. 10 (*a*) to (*d*).

Figure 3:
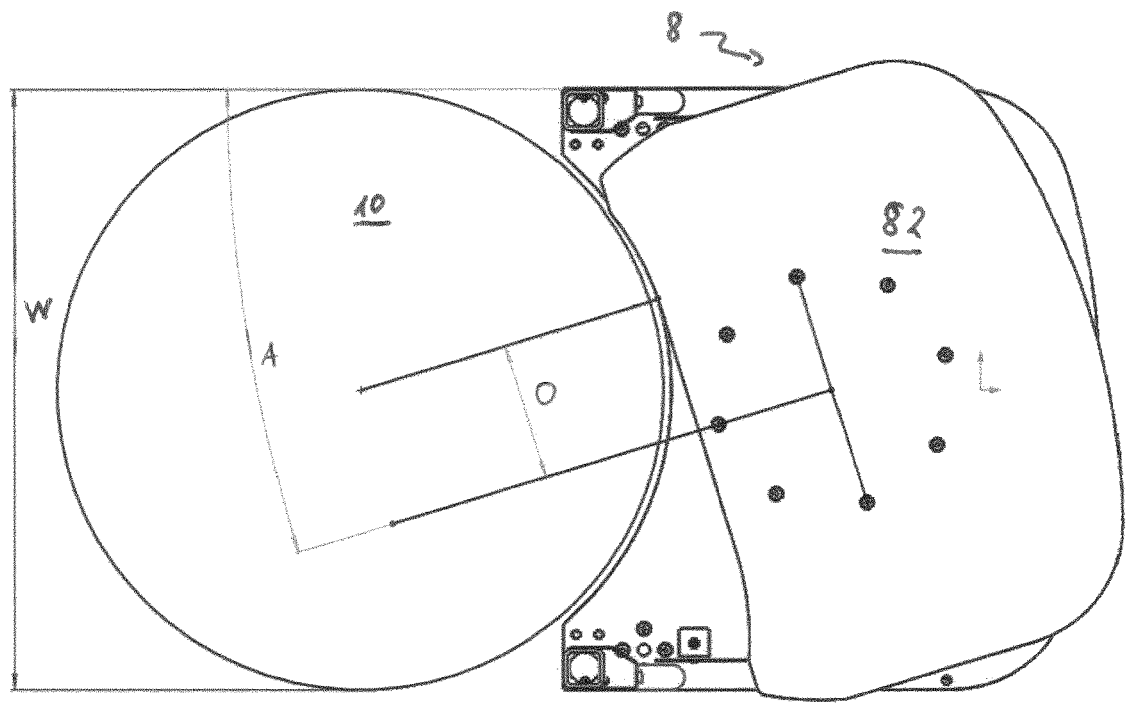
FIG. 3 depicts a top cross-sectional view of sections of a robot according to embodiments of the present invention.

FIG. 3 depicts a schematic cross sectional view of the robot 2 depicted in FIG. 1 along line A-A. Again, the pick up unit 10 is depicted by means of a schematic circle 10, and a case board 82 of the shelf unit 8 is depicted. In the embodiment depicted in FIG. 3, exemplary dimensions of the robot 2 or section of the robot 2 are included. The robot 2 may have a width of 60 cm. In the depicted embodiment and configuration, the pick up device 110 of the pick up unit 10 is at an angle A of 17° from a configuration with full perpendicularity to the shelf unit 8 or to the case board 82. The case board 82 is also rotated by 17° from its rest position. In the depicted embodiments, this leads to an offset O of 13.7 cm. It will be understood that the robot 2 may also rotate the pick up device 110 and the case board 82 in the opposite direction, i.e., to −17°, leading to an offset of −13.7 cm. Thus, the robot depicted in FIG. 3 may put objects onto a case board 82 of the shelf unit in a range of 27.4 cm, which may considerably increase the storage capacity of the depicted robot 2 vis-à-vis robots where the shelf unit 8 is not rotatable. One advantage vis-à-vis non-rotatable shelfs is that the depicted embodiment allows storing items parallel to one another. Thus, less storage space is lost between the items.

Figure 4:
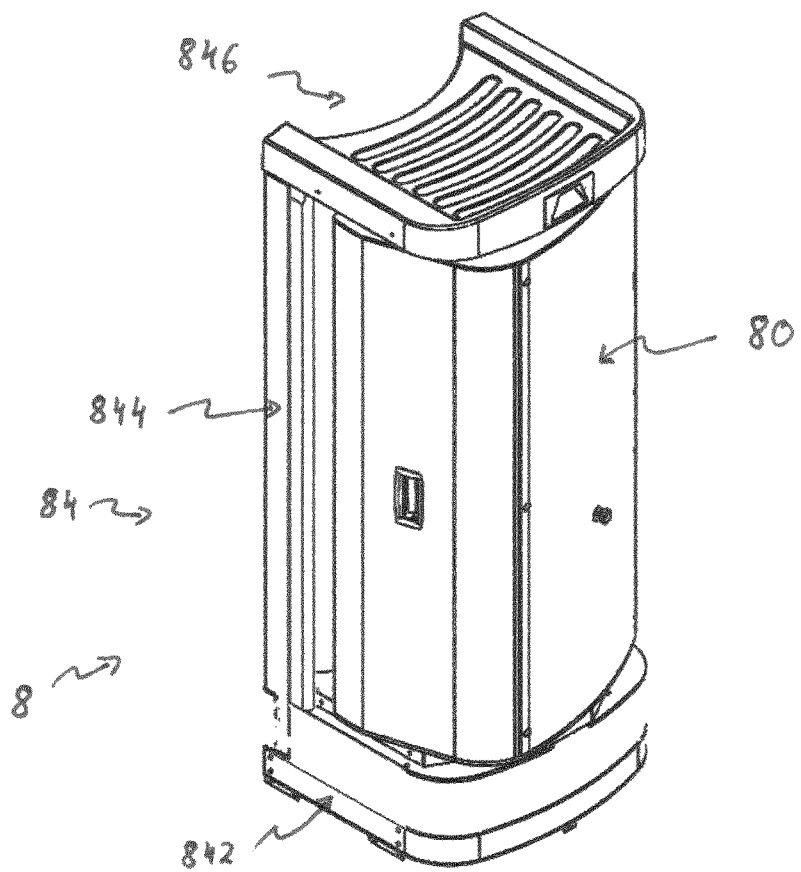
FIG. 4 depicts a shelf unit of a robot according to embodiments of the present invention.
Figure 5:
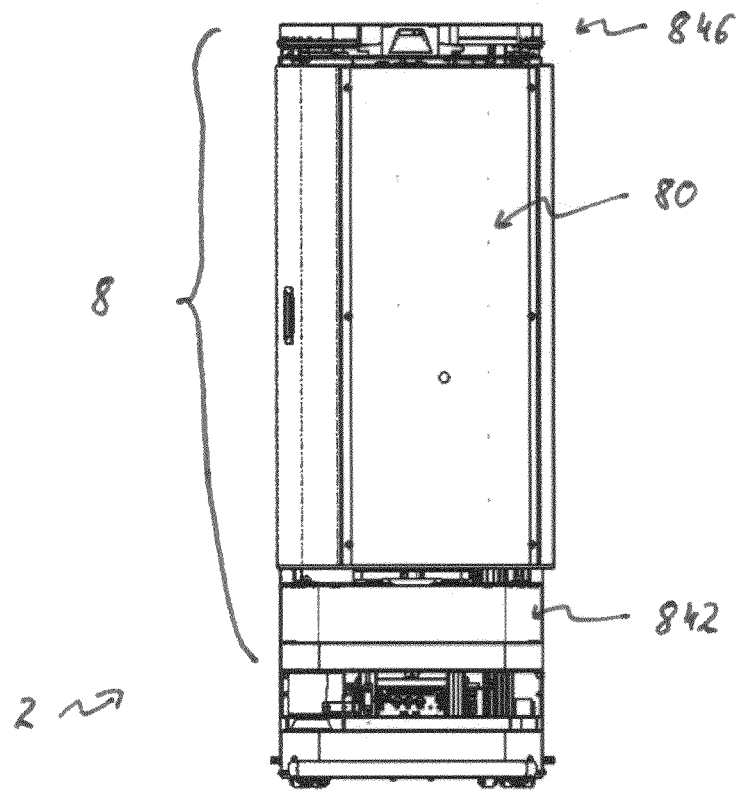
FIG. 5 depicts another side view of the robot of FIG. 1.

Further details of the robot 2 and the shelf unit 8 will now be described with primary reference to FIGS. 4 and 5. FIG. 5 depicts another side view of the robot 2, and FIG. 4 depicts a perspective view of the shelf unit 8. The shelf unit 8 comprises different sections or portions. More particularly, the shelf unit 8 comprises a support structure or support frame 84 and a rotatable portion 80. The rotatable portion 80 comprises the case boards 82 (hidden in FIGS. 4 and 5). The rotatable portion 80 is rotatable with respect to the support frame 84. In the depicted embodiments, the support frame 84, which may also be referred to as the support structure 84, comprises a bottom support structure 842, a top support structure 846, and supporting bars 844 connecting the bottom support structure 842 and the top support structure 846. The support structure or support frame 84 is fixed (i.e., not rotatable) and supports the remainder of the shelf unit 8, i.e., the rotatable portion 80. In the depicted embodiment, the rotatable portion 80 is located vertically between the bottom support structure 842 and the top support structure 846. The top support structure 846 rotatably supports the rotatable portion 80 from above. The rotatable portion 80 of the shelf unit 8 may comprise the case boards 82 and a housing surrounding the case boards 82 and/or delimiting the case boards 82 from the outside. This may increase the safety of the robot 2, as only the housing is exposed to the outside, and not the case boards 82 which may have edges and/or items transported on the case boards 82. However, it is noted that in other embodiments, the housing may also be non-rotatable with respect to the support structure 84. In such a case, the rotatable portion including the case boards would also be rotatable vis-à-vis the housing.

Figure 6:
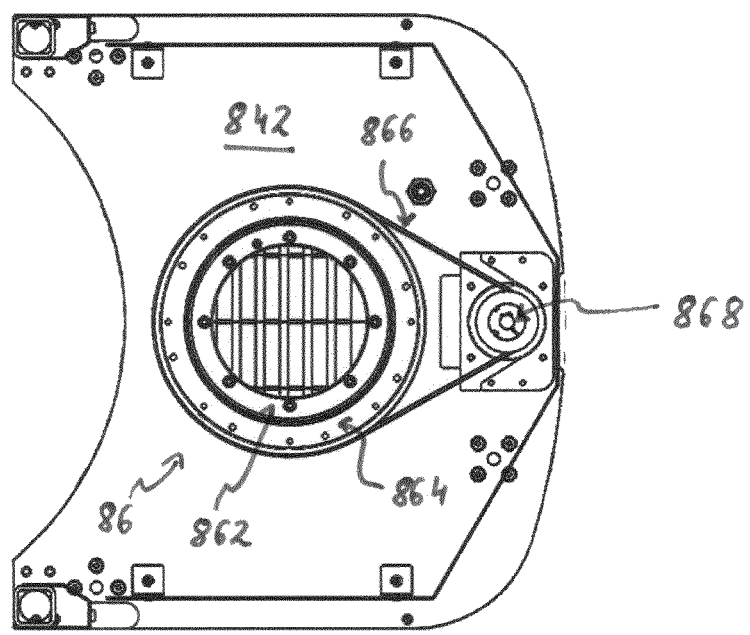
FIG. 6 depicts a section of a robot according to embodiments of the present invention.

Further details of a rotation mechanism for rotating the portion 80 are depicted in FIG. 6. This Fig. depicts a top view of the bottom support structure 842. The rotation mechanism comprises a ball bearing 86, such as a 4-point ball bearing (which may be obtained by Franke GmbH, Aalen, Germany), with an inner ring 862 and an outer ring 864, the outer ring 864 being rotatable with respect to the inner ring 862. The inner ring 862 may be fixed to the bottom support structure 842 and the outer ring 864 may be movable (i.e., rotatable) with respect to the bottom support structure 842. The outer ring 864 comprises a geared circumference. The rotation mechanism further comprises a drive belt 866, which may be toothed and which may gear into the geared circumference of the outer ring 864. The rotation mechanism also comprises a driver or pinion 868 for driving the drive belt 866 and thus the outer ring 864. The pinion 868 itself is driven by a motor (which is also part of the rotation mechanism), which motor may be a step motor. Thus, the outer ring 864 may rotate with respect to the inner ring 862.

The rotatable portion 80 of the shelf unit 8 is mounted (i.e., fixed) to the outer ring 864, and is thus rotatable with respect to the inner ring 862 and with respect to the bottom support structure 842. The connection between the rotatable portion 80 of the shelf unit 8 and the inner ring 862 may be provided by means of a drive pin. Furthermore, there may be provided a rotation delimiter limiting the movement of the drive pin (and thus, also the rotation range of the rotation mechanism and thus the rotatable portion). The rotation delimiter may comprise abutment structures to which the drive pin abuts. As an example, the rotation delimiter may be realized as a circular structure having an opening allowing the drive pin to move in the opening. Thus, the drive pin, and hence the rotatable portion 80, may be delimited in their rotation. As also depicted in FIG. 3, exemplary values for the rotation limitation include 20° to 40° (i.e., 10° to 20° in both directions), such as 34° (i.e., 17° in both directions).

In the above figure description, the present invention has been described with reference to an embodiment of a robot 2 having an exemplary pick up unit 10. However, it should be understood that the hitherto described pick up unit 10 is merely exemplary and that other embodiments of the present invention are also possible. This is further illustrated in FIGS. 11 and 12. In these Figures, features like the ones discussed above are identified by like reference numerals (and the description of such features may be omitted for sake of brevity of description).

While the shelf unit 80 in the embodiment depicted in FIGS. 11 and 12 may be like the one described above, the pick up unit 10 may be different. More particularly, FIG. 1 depicts a pick up unit 10 of a "tower type", where the pick up unit 10 resembles a tower that is supported on its lower end by a base plate 4 of the robot 2.

To the contrary, the pick up unit 10 of the embodiment of FIGS. 11 and 12 is not supported from below. Instead, the pick up unit 10 is a "suspension type" pick up unit 10. This pick up unit is not supported from below, but is suspended. In simple terms, the robot 2 of FIGS. 11 and 12 also comprises at least one vertical bar 102 (such as two bars 102) and a pick up section 105 which may travel along the bar(s) 102 in the vertical direction. The pick up section 105 comprises a pick up device 110, which may be the pick up device 110 as described above in conjunction with FIGS. 7a to 8b, for example. In the embodiment of FIGS. 11 and 12, the pick up section 105 also comprises a housing 106, housing the pick up device 110 and delimiting it from the outside, e.g., to render the robot 2 safer. Furthermore, in the embodiment depicted in FIGS. 11 and 12, the pick up device 10 also comprises a top plate 104, and the pick up section 105 is rotatably mounted to top plate 104. The rotatable connection between the two may be similar to the rotatable connection between bottom support unit 842 and the rotatable portion 80 of the shelf unit 8 discussed above in conjunction with FIG. 6.

It will therefore be understood that the suspended pick up unit 10 of FIG. 11 is movable in the vertical direction (by being movable along the bar(s) 102). Furthermore, as before, the bar(s) may also be telescopable to allow the robot 2 to reach objects in greater heights, while still allowing the robot 2 to travel under low clearances.

Furthermore, by means of the rotation between top plate 104 and pick up section 105, the pick up device 110 is also rotatable. As discussed above, the pick up device is also extendible and retractable in a horizontal direction. Thus, the pick up unit 10 of FIG. 11 also allows objects in different locations to be picked up by the robot 2.

Also in the embodiment depicted in FIGS. 11 and 12, the shelf unit 8 comprises a section 80 that is rotatable with respect to a shelf support structure. The rotatable section or portion 80 again comprises the case boards 82. As discussed above, this allows the storage space in the shelf unit 8 to be used more efficiently.

One further advantage of the robot 2 depicted in FIGS. 11 and 12, i.e., the suspension type robot 2, is that the suspension type pick up unit 10 is not supported from below, i.e., there is no further portion of the robot 2 below the pick up unit 10. Thus, the pick up unit may reach objects that are located very close to the ground or, in fact, on the ground level, thereby increasing the usability of the robot 2.

Further features of the robot 2 depicted in FIGS. 11 and 12, and particularly the pick up unit 10 and the exact pick up mechanism are also described in EP17000402, filed 11 Mar. 2017, which is incorporates herein by reference in its entirety.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

The invention claimed is:

1. A method to pick up and transport items, the method using a robot configured to pick up and transport items;
   wherein the robot comprises a pick up unit, wherein the pick up unit comprises a pick up device configured to pick up and release items, wherein the robot is configured to move the pick up device along a first direction, rotate the pick up device around a first axis, and extend and retract the pick up device along a second direction different from the first direction;
   wherein the robot further comprises a shelf unit configured to temporarily store items, wherein the shelf unit comprises a rotatable portion and a support structure, wherein the rotatable portion is rotatable with respect to the support structure;
   wherein the rotatable portion of the shelf unit is rotatable around a shelf unit rotation axis that is parallel to the first axis, wherein the connection between the first axis and the shelf unit rotation axis defines a connection line;
   wherein the rotatable portion comprises a plurality of case boards for supporting the items;
   the method comprising
   the robot travelling to a first shelf;
   the robot picking up a first item by means of the pick up unit;
   the robot transferring the first item to the shelf unit after the robot picking up the first item;
   the robot picking up a second item by means of the pick up unit; and
   the robot transferring the second item to the shelf unit after the robot picking up the second item;
   wherein
   in the step of the robot transferring the first item to the shelf unit, the first item is placed on a case board, and
   in the step of the robot transferring the second item to the shelf unit, the second item is placed on said case board, while the first item is located on said shelf board
   wherein in the step of the robot transferring the first item to the shelf unit, the pick up device assumes a first pick up device angle configuration with respect to the connection line and the rotatable portion assumes a first shelf angle configuration with respect to the connection line, and in the step of the robot transferring the second item to the shelf unit, the pick up device assumes a second pick up device angle configuration with respect to the connection line and the rotatable portion assumes a second shelf angle configuration with respect to the connection line, wherein the second pick up device angle configuration differs from the first pick up device angle configuration by a pick up device difference angle, the second shelf angle configuration differs from the first shelf angle configuration by a shelf difference angle, and wherein the pick up device difference angle equals the shelf difference angle.

2. The method according to claim 1, wherein the method comprises the pick up device being rotated around the first axis after the robot picking up the first item and before the robot transferring the first item to the shelf unit.

3. The method according to claim 1, wherein the connection between the first axis and the shelf unit rotation axis defines a connection line;

wherein in the step of the robot transferring the first item to the shelf unit, the pick up device extends along the second direction, wherein, in this step, the second direction is different from the connection line by a rotation angle, and further wherein in the step of the robot transferring the first item to the shelf unit, the rotatable portion of the shelf unit is rotated from a rest position of the rotatable portion by the rotation angle.

4. The method according to claim 3, wherein the first item and the second item are regularly shaped objects and wherein the second item is placed on said case board parallel to the first item.

5. The method according to claim 2, wherein the method further comprises the robot picking up a third item by means of the pick up unit; and the robot transferring the third item to the shelf unit after the robot picking up the second item;

wherein in the step of the robot transferring the third item to the shelf unit, the third item is placed on said case board, while the first item and the second item are located on said shelf board.

6. The method according to claim 5, wherein the third item is a regularly shaped object and wherein the third item is placed on said case board parallel to the first item and to the second item.

7. The method according to claim 1, wherein the support structure comprises a shelf housing that houses the case boards.

8. The method according to claim 7, wherein the support structure comprises a top support structure located above the rotatable portion.

9. The method according to claim 8, wherein the support structure further comprises a bottom support structure, wherein the rotatable portion is located above the bottom support structure, and support bars connecting the top support structure and the bottom support structure.

10. The method according to claim 1, wherein the rotatable portion is rotatable with respect to the support structure by at least 10°, and wherein the rotatable portion is rotatable with respect to the support structure by not more than 100°, and wherein the robot comprises a rotation delimiter for delimiting the rotation of the rotatable portion.

11. The method according to claim 1, wherein the robot comprises at least one bar, such as two bars, disposed along the first direction, and wherein the pick up device is movable along the at least one bar; wherein the at least one bar is telescopable between a retracted and an extended configuration.

12. The method according to claim 1, wherein the pick up unit further comprises a pick up unit housing that houses the pick up device.

* * * * *